US012288529B2

(12) United States Patent
Pyun et al.

(10) Patent No.: US 12,288,529 B2
(45) Date of Patent: Apr. 29, 2025

(54) DRIVING CONTROLLER AND DISPLAY DEVICE INCLUDING THE SAME

(71) Applicant: Samsung Display Co., Ltd., Yongin-Si (KR)

(72) Inventors: Kihyun Pyun, Yongin-si (KR); Seungho Park, Yongin-si (KR); Sung-Mo Yang, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 18/750,577

(22) Filed: Jun. 21, 2024

(65) Prior Publication Data

US 2024/0428742 A1 Dec. 26, 2024

(30) Foreign Application Priority Data

Jun. 22, 2023 (KR) ........................ 10-2023-0080308

(51) Int. Cl.
*G09G 3/3275* (2016.01)
*G09G 3/32* (2016.01)

(52) U.S. Cl.
CPC ............ *G09G 3/3275* (2013.01); *G09G 3/32* (2013.01); *G09G 2310/0275* (2013.01); *G09G 2320/0271* (2013.01); *G09G 2320/0626* (2013.01); *G09G 2330/021* (2013.01); *G09G 2330/025* (2013.01); *G09G 2330/028* (2013.01)

(58) Field of Classification Search
CPC ................... G09G 3/3275; G09G 3/32; G09G 2310/0275; G09G 2320/0271; G09G 2320/0626; G09G 2330/021; G09G 2330/025; G09G 2330/028
See application file for complete search history.

(56) References Cited

U.S. PATENT DOCUMENTS

| | | | |
|---|---|---|---|
| 7,068,265 | B2 | 6/2006 | Kim |
| 7,230,614 | B2 | 6/2007 | Kim et al. |
| 11,289,018 | B2 | 3/2022 | Kim et al. |
| 11,605,331 | B2 | 3/2023 | Pyun et al. |

(Continued)

FOREIGN PATENT DOCUMENTS

| | | | |
|---|---|---|---|
| KR | 10-0394006 | B1 | 8/2003 |
| KR | 10-0421869 | B1 | 3/2004 |

(Continued)

*Primary Examiner* — Andrew Sasinowski
(74) *Attorney, Agent, or Firm* — Innovation Counsel LLP

(57) ABSTRACT

A driving controller includes an overcurrent load calculator calculating a load of an input image signal, comparing the load and a reference load, and outputting a first signal corresponding to a first comparison result, an overcurrent reference controller analyzing a grayscale of the input image signal and outputting one of a first reference current signal corresponding to the grayscale and a second reference current signal, whose current level is higher than that of the first reference current signal, as a reference current signal, a current sensor receiving a feedback current signal, comparing a current level of the feedback current signal and a current level of the reference current signal, and outputting a second signal corresponding to a second comparison result, and a voltage controller outputting a voltage control signal for adjusting a voltage level of a driving voltage, based on the first signal and the second signal.

20 Claims, 14 Drawing Sheets

(56) References Cited

U.S. PATENT DOCUMENTS

| | | | | |
|---|---|---|---|---|
| 2014/0354703 | A1* | 12/2014 | Han | G09G 3/3233<br>345/83 |
| 2021/0201781 | A1* | 7/2021 | Kim | G09G 3/3233 |
| 2022/0215803 | A1 | 7/2022 | Pyun et al. | |
| 2022/0309985 | A1* | 9/2022 | Pyun | G09G 3/2007 |
| 2022/0343867 | A1* | 10/2022 | Lee | G09G 3/3208 |

FOREIGN PATENT DOCUMENTS

| | | | |
|---|---|---|---|
| KR | 10-0459166 | B1 | 12/2004 |
| KR | 10-2253684 | B1 | 5/2021 |
| KR | 10-2021-0086793 | A | 7/2021 |
| KR | 10-2022-0099169 | A | 7/2022 |
| KR | 10-2022-0134806 | A | 10/2022 |

* cited by examiner

DRIVING CONTROLLER AND DISPLAY DEVICE INCLUDING THE SAME

CROSS-REFERENCE TO RELATED APPLICATIONS

This application claims priority under 35 U.S.C. § 119 to Korean Patent Application No. 10-2023-0080308 filed on Jun. 22, 2023, in the Korean Intellectual Property Office, the disclosures of which are incorporated by reference herein in their entireties.

BACKGROUND

Embodiments of the present disclosure described herein relate to a display device including a driving controller.

An electronic device which provides an image to a user, such as a smartphone, a digital camera, a notebook computer, a navigation system, a monitor, or a smart television, includes a display device for displaying the image. The display device generates an image and provides the user with the generated image through a display screen.

The display device includes a display panel and a driving controller for controlling the display panel. As the driving controller provides data signals to the display panel and currents corresponding to the data signals are provided to pixels of the display panel, a given image may be displayed.

To prevent the increase in power consumption of the display device, the driving controller may adjust the luminance of the display panel depending on a load of an input image signal. For example, when the load of the input image signal is relatively great, the driving controller may decrease the luminance of the display panel; when the load of the input image signal is relatively small, the driving controller may not decrease the luminance of the display panel.

SUMMARY

Embodiments of the present disclosure provide a driving controller capable of preventing excessive power consumption of a display panel and a display device including the same.

According to an embodiment, a driving controller may include an overcurrent load calculator, an overcurrent reference controller, a current sensor, and a voltage controller. The overcurrent load calculator calculates a load of an input image signal, compares the load and a reference load, and outputs a first signal corresponding to a first comparison result. The overcurrent reference controller analyzes a grayscale of the input image signal and outputs one of a first reference current signal corresponding to the grayscale and a second reference current signal, whose current level is higher than that of the first reference current signal, as a reference current signal. The current sensor receives a feedback current signal, compares a current level of the feedback current signal and a current level of the reference current signal, and outputs a second signal corresponding to a second comparison result. The voltage controller outputs a voltage control signal for adjusting a voltage level of a driving voltage, based on the first signal and the second signal.

In an embodiment, the overcurrent reference controller may output the first reference current signal as the reference current signal when the load corresponding to the input image signal belongs to a first load zone and may output the second reference current signal as the reference current signal when the load corresponding to the input image signal belongs to a second load zone different from the first load zone.

In an embodiment, the overcurrent reference controller may output the first reference current signal as the reference current signal when a voltage level of a prediction voltage signal corresponding to the grayscale is lower than a voltage level of a target voltage signal and may output the second reference current signal as the reference current signal when the voltage level of the prediction voltage signal corresponding to the grayscale is higher than or equal to the voltage level of the target voltage signal.

In an embodiment, when the load is lower than the reference load, the overcurrent load calculator may output the first signal of an active level.

In an embodiment, when the current level of the feedback current signal is higher than the current level of the reference current signal, the current sensor may output the second signal of the active level.

In an embodiment, when both the first signal and the second signal are at the active level, the voltage controller may output the voltage control signal such that the voltage level of the driving voltage decreases.

In an embodiment, when the load is higher than or equal to the reference load, the overcurrent load calculator may output the first signal of an inactive level.

In an embodiment, the overcurrent reference controller may include a grayscale analyzer that analyzes the grayscale of the input image signal and outputs a maximum grayscale in one frame, a power control block that outputs a prediction voltage signal based on the maximum grayscale and the load, and an overcurrent reference setting block that compares the prediction voltage signal and a target voltage signal and outputs one of the first reference current signal and the second reference current signal as the reference current signal depending on a third comparison result.

In an embodiment, the overcurrent reference setting block may output the first reference current signal as the reference current signal when a voltage level of the prediction voltage signal is lower than a voltage level of the target voltage signal and may output the second reference current signal as the reference current signal when the voltage level of the prediction voltage signal is higher than or equal to the voltage level of the target voltage signal.

In an embodiment, the overcurrent load calculator may include a power luminance controller that calculates the load of the input image signal and an overcurrent control determiner that outputs the first signal corresponding to the first comparison result of the load and the reference load.

In an embodiment, the overcurrent control determiner may output the first signal of an active level when the load is lower than the reference load and may output the first signal of an inactive level when the load is higher than or equal to the reference load.

According to an embodiment, a display device may include a display panel, a driving controller that receives an input image signal and outputs an image data signal, a data driving circuit that provides a data signal corresponding to the image data signal to the display panel, and a voltage generator that provides a driving voltage to the display panel in response to a voltage control signal. The driving controller may include an overcurrent load calculator, an overcurrent reference controller, a current sensor, and a voltage controller. The overcurrent load calculator calculates a load of the input image signal, compares the load and a reference load, and outputs a first signal corresponding to a first comparison result. The overcurrent reference controller analyzes a grayscale of the input image signal and outputs one of a first reference current signal corresponding to the grayscale and a second reference current signal, whose current level is higher than that of the first reference current signal, as a reference current signal. The current sensor receives a feedback current signal from the display panel, compares a current level of the feedback current signal and a current level of the reference current signal, and outputs a second signal corresponding to a second comparison result. The voltage controller outputs the voltage control signal based on the first signal and the second signal.

In an embodiment, the overcurrent reference controller may output the first reference current signal as the reference current signal when a voltage level of a prediction voltage signal corresponding to the grayscale is lower than a voltage level of a target voltage signal and may output the second reference current signal as the reference current signal when the voltage level of the prediction voltage signal corresponding to the grayscale is higher than or equal to the voltage level of the target voltage signal.

In an embodiment, the overcurrent load calculator may output the first signal of an active level when the load is lower than the reference load and may output the first signal of an inactive level when the load is higher than or equal to the reference load.

In an embodiment, when the current level of the feedback current signal is higher than the current level of the reference current signal, the current sensor may output the second signal of the active level.

In an embodiment, when both the first signal and the second signal are at the active level, the voltage controller may output the voltage control signal such that a voltage level of the driving voltage decreases.

In an embodiment, the overcurrent reference controller may include a grayscale analyzer that analyzes the grayscale of the input image signal and outputs a maximum grayscale in one frame, a power control block that outputs a prediction voltage signal based on the maximum grayscale and the load, and an overcurrent reference setting block that compares the prediction voltage signal and a target voltage signal and outputs one of the first reference current signal and the second reference current signal as the reference current signal depending on a third comparison result.

In an embodiment, the overcurrent reference setting block may output the first reference current signal as the reference current signal when a voltage level of the prediction voltage signal is lower than a voltage level of the target voltage signal and may output the second reference current signal as the reference current signal when the voltage level of the prediction voltage signal is higher than or equal to the voltage level of the target voltage signal.

In an embodiment, the overcurrent load calculator may include a power luminance controller that calculates the load of the input image signal and an overcurrent control determiner that outputs the first signal corresponding to the first comparison result of the load and the reference load.

In an embodiment, the power luminance controller may output the data signal obtained by adjusting a gray level of the input image signal based on the load.

BRIEF DESCRIPTION OF THE FIGURES

The above and other features of the present disclosure will become apparent by describing in detail embodiments thereof with reference to the accompanying drawings.

DETAILED DESCRIPTION

Figure 1:
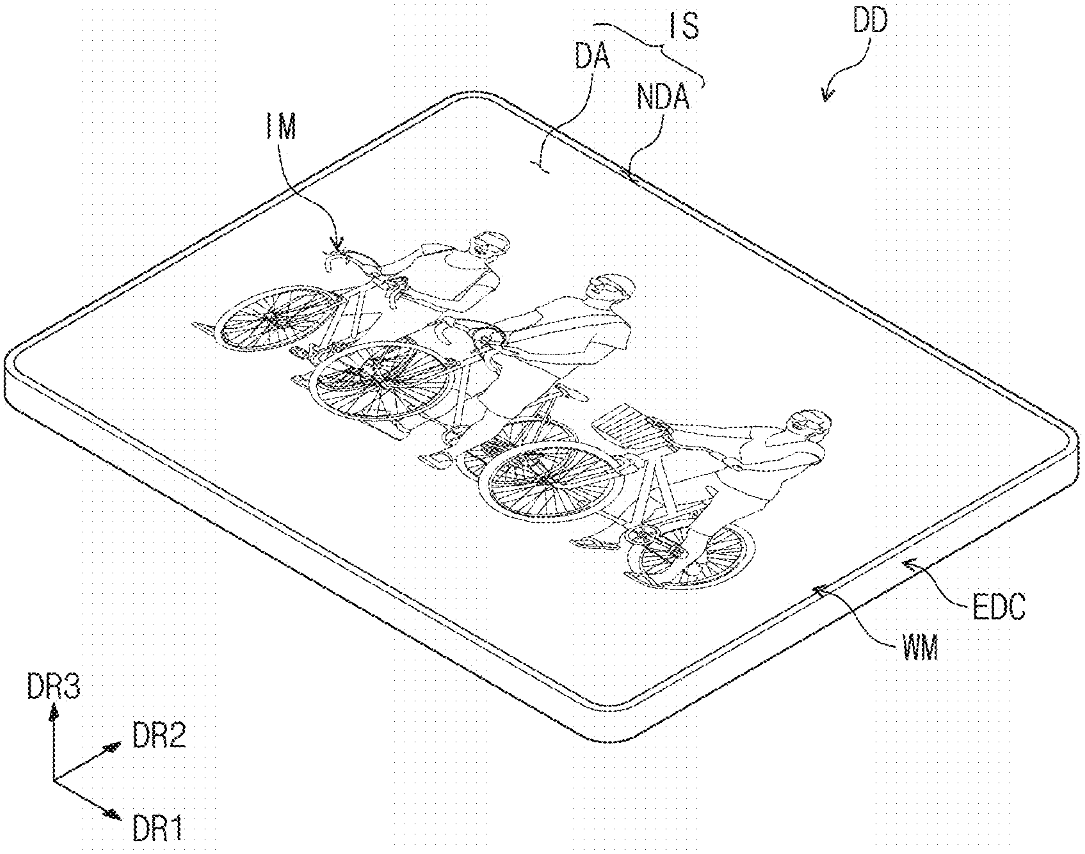
FIG. 1 is a perspective view illustrating a display device according to an embodiment of the present disclosure.

In the specification, the expression that a first component (or region, layer, part, etc.) is "on", "connected to", or "coupled to" a second component means that the first component is directly on, connected to, or coupled to the second component or means that a third component is interposed therebetween.

The same reference numerals/signs refer to the same components. Also, in drawings, the thickness, ratio, and dimension of components are exaggerated for effectiveness of description of technical contents. The term "and/or" includes one or more combinations of the associated listed items.

The terms "first", "second", etc. are used to describe various components, but the components are not limited by the terms. The terms are only used to distinguish one component from another component. For example, without departing from the scope and spirit of the inventive concept, a first component may be referred to as a "second component", and similarly, the second component may be referred to as the "first component". The articles "a", "an", and "the" are singular in that they have a single referent, but the use of the singular form in the specification should not preclude the presence of more than one referent.

Also, the terms "under", "beneath", "on", "above", etc. are used to describe a relationship between components illustrated in a drawing. The terms are relative and are described with reference to a direction indicated in the drawing.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in this specification have the same meaning as commonly understood by those skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Below, embodiments of the present disclosure will be described with reference to drawings.

Figure 2:
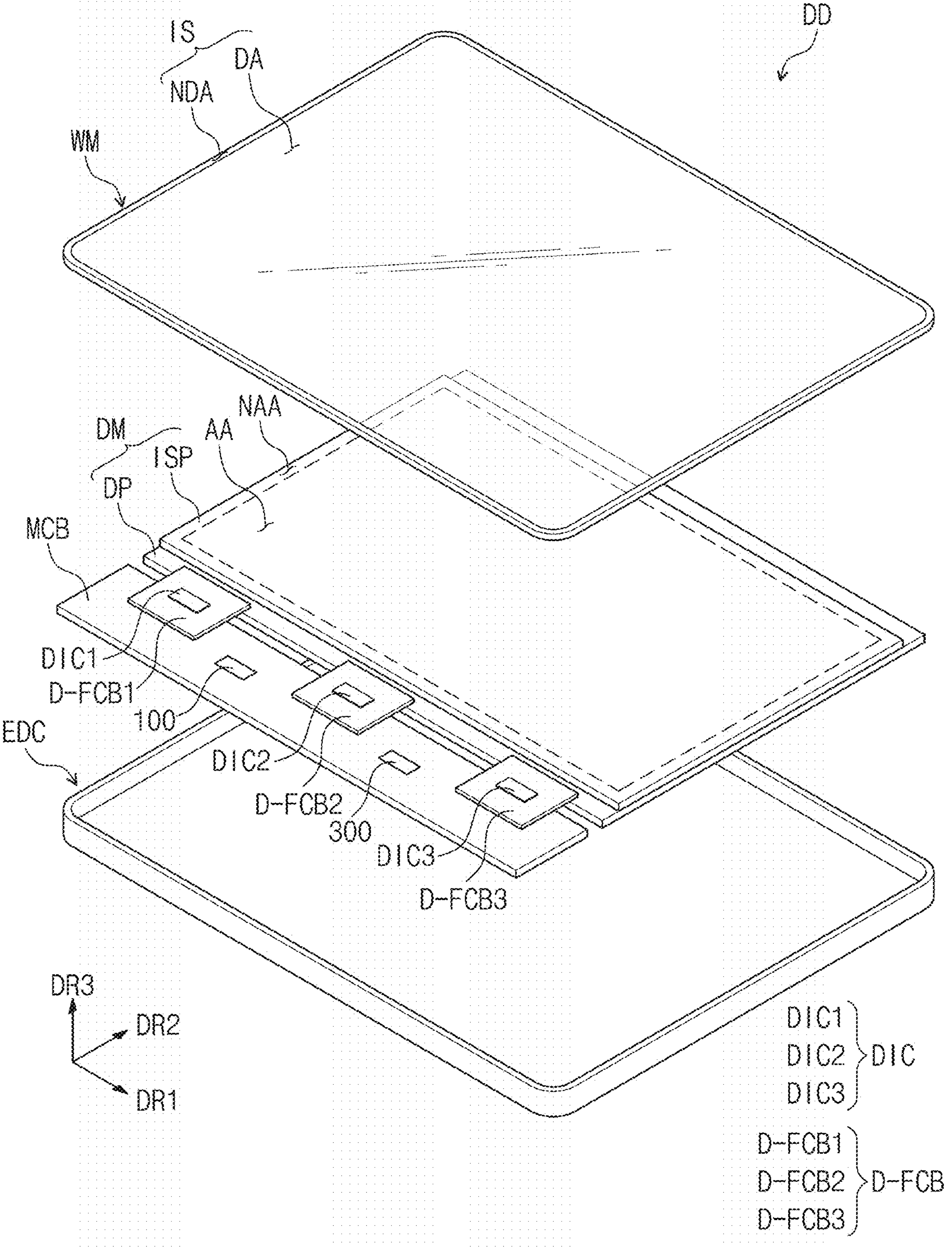
FIG. 2 is an exploded perspective view of a display device according to an embodiment of the present disclosure.

FIG. 1 is a perspective view of a display device DD according to an embodiment of the present disclosure. FIG. 2 is an exploded perspective view of the display device DD according to an embodiment of the present disclosure.

Referring to FIGS. 1 and 2, the display device DD may be a device that is activated depending on an electrical signal. The display device DD according to the present disclosure may be a small and medium-sized electronic device such as a mobile phone, a tablet, an automotive navigation system, or a game console, as well as a large-sized electronic device such as a television or a monitor. The above examples are provided only as an example, and it is obvious that the display device DD may include any other display device(s) without departing from the concept of the inventive concept. The display device DD is in the shape of a rectangle having a long edge (or side) in a first direction DR1 and having a short edge (or side) in a second direction DR2 intersecting the first direction DR1. However, the shape of the display device DD is not limited thereto. For example, the display device DD may be implemented in various shapes. The display device DD may display an image IM on a display surface IS parallel to each of the first direction DR1 and the second direction DR2, so as to face a third direction DR3. The display surface IS on which the image IM is displayed may correspond to a front surface of the display device DD. In an embodiment, a front surface (or an upper/top surface) and a rear surface (or a lower/bottom surface) of each member are defined with respect to a direction in which the image IM is displayed. The front surface and the rear surface may be opposite to each other in the third direction DR3, and the normal direction of each of the front surface and the rear surface may be parallel to the third direction DR3.

A separation distance between the front surface and the rear surface in the third direction DR3 may correspond to a thickness of the display device DD in the third direction DR3. Meanwhile, directions that the first, second, and third directions DR1, DR2, and DR3 indicate may be relative in concept and may be changed to different directions.

The display device DD may sense an external input applied from the outside. The external input may include various types of inputs that are provided from the outside of the display device DD. The display device DD according to an embodiment of the present disclosure may sense an external input of a user, which is applied from the outside. The external input of the user may be one of various types of external inputs, such as a part of his/her body, a light, heat, his/her eye, and pressure, or a combination thereof. Also, the display device DD may sense the external input of the user applied to the side surface or rear surface of the display device DD depending on a structure of the display device DD and is not limited to any one embodiment. As an example of the present disclosure, the external input may include an input that is applied by using an input device (e.g., a stylus pen, an active pen, a touch pen, an electronic pen, or an E-pen).

The display surface IS of the display device DD may be divided into a display area DA and a non-display area NDA. The display area DA may refer to an area in which the image IM is displayed. The user visually perceives the image IM through the display area DA. In an embodiment, the display area DA is illustrated in the shape of a quadrangle whose vertexes are rounded. However, this is illustrated as an example. The display area DA may have various shapes, not limited to any one embodiment.

The non-display area NDA is adjacent to the display area DA. The non-display area NDA may have a given color. The non-display area NDA may surround the display area DA. As such, the shape of the display area DA may be defined substantially by the non-display area NDA. However, this is illustrated as an example. The non-display area NDA may be disposed adjacent to only one side of the display area DA or may be omitted. The display device DD according to an embodiment of the present disclosure may include various embodiments and is not limited to any one embodiment.

As illustrated in FIG. 2, the display device DD may include a display module DM and a window WM disposed on or over the display module DM. The display module DM may include a display panel DP and an input sensing layer ISP.

The display panel DP according to an embodiment of the present disclosure may be a light emitting display panel. For example, the display panel DP may be an organic light emitting display panel, an inorganic light emitting display panel, or a quantum dot light emitting display panel. An emission layer of the organic light emitting display panel may include an organic light emitting material. An emission layer of the inorganic light emitting display panel may include an inorganic light emitting material. An emission layer of the quantum dot light emitting display panel may include a quantum dot, a quantum rod, etc. In an embodiment, below, the description will be given under the condition that the display panel DP is an organic light emitting display panel.

The display panel DP may output the image IM, and the output image IM may be displayed through the display surface IS.

The input sensing layer ISP may be disposed on the display panel DP to sense an external input. The input sensing layer ISP may be directly disposed on the display panel DP. According to an embodiment of the present disclosure, the input sensing layer ISP may be formed on the display panel DP by a consecutive process. That is, in the case where the input sensing layer ISP is directly disposed on the display panel DP, an inner adhesive film (not illustrated) is not interposed between the input sensing layer ISP and the display panel DP. However, an inner adhesive film may be interposed between the input sensing layer ISP and the display panel DP. In this case, the input sensing layer ISP is not manufactured by a process subsequent to that of the display panel DP. That is, the input sensing layer ISP may be manufactured through a process that is independent of that of the display panel DP and may then be fixed on the upper surface of the display panel DP by the inner adhesive film.

The window WM may be formed of a transparent material capable of outputting the image IM. For example, the window WM may be formed of glass, sapphire, plastic, etc. An example in which the window WM is implemented with a single layer is illustrated, but the present disclosure is not limited thereto. For example, the window WM may include a plurality of layers.

Meanwhile, although not illustrated, the non-display area NDA of the display device DD described above may correspond to an area that is defined by printing a material including a given color on one area of the window WM. As an example of the present disclosure, the window WM may include a light blocking (or shielding) pattern for defining the non-display area NDA. The light blocking pattern that is a colored organic film may be formed, for example, in a coating manner.

The window WM may be coupled to the display module DM by an adhesive film. As an example of the present disclosure, the adhesive film may include an optically clear adhesive (OCA) film. However, the adhesive film is not limited thereto. For example, the adhesive film may include a typical adhesive or sticking agent. For example, the adhesive film may include an optically clear resin (OCR) film or a pressure sensitive adhesive (PSA) film.

An anti-reflection layer may be further interposed between the window WM and the display module DM. The anti-reflection layer decreases reflectance of an external light incident from above the window WM. The anti-reflection layer according to an embodiment of the present disclosure may include a retarder and a polarizer. The polarizer may be of a film type or a liquid crystal coating type. The film type may include a stretch-type synthetic resin film, and the liquid crystal coating type may include liquid crystals arranged in a given direction. A phase retarder and the polarizer may be implemented with one polarization film.

As an example of the present disclosure, the anti-reflection layer may also include color filters. The arrangement of color filters may be determined in consideration of colors of lights that a plurality of pixels PX (refer to FIG. 3) included in the display panel DP generate. Also, the anti-reflection layer may further include a light blocking pattern.

The display module DM may display the image IM depending on an electrical signal and may transmit/receive information about an external input. The display module DM may be defined by an effective area AA and a non-effective area NAA. The effective area AA may be defined as an area through which the image IM provided from the display area DA is output. Also, the effective area AA may be defined as an area in which the input sensing layer ISP senses an external input applied from the outside.

The non-effective area NAA is adjacent to the effective area AA. For example, the non-effective area NAA may surround the effective area AA. However, this is illustrated as an example. For example, the non-effective area NAA may be defined in various shapes, not limited to any one embodiment. According to an embodiment, the effective area AA of the display module DM may correspond to at least a portion of the display area DA.

The display device DD may further include a main circuit board MCB, flexible circuit films D-FCB, driver chips DIC, a driving controller 100, and a voltage generator 300. The main circuit board MCB may be connected to the flexible circuit films D-FCB so as to be electrically connected to the display panel DP. The flexible circuit films D-FCB are connected to the display panel DP so as to electrically connect the display panel DP to the main circuit board MCB. The main circuit board MCB may include a plurality of driving elements. The plurality of driving elements may include a circuit unit for driving the display panel DP. The driver chips DIC may be mounted on the flexible circuit films D-FCB, respectively.

As an example of the present disclosure, the flexible circuit films D-FCB may include a first flexible circuit film D-FCB1, a second flexible circuit film D-FCB2, and a third flexible circuit film D-FCB3. The driver chips DIC may include a first driver chip DIC1, a second driver chip DIC2, and a third driver chip DIC3. The first to third flexible circuit films D-FCB1, D-FCB2, and D-FCB3 may be positioned spaced from one another in the first direction DR1 and may be connected with the display panel DP so as to electrically connect the display panel DP and the main circuit board MCB. The first driver chip DIC1 may be mounted on the first flexible circuit film D-FCB1. The second driver chip DIC2 may be mounted on the second flexible circuit film D-FCB2. The third driver chip DIC3 may be mounted on the third flexible circuit film D-FCB3. However, the present disclosure is not limited thereto. For example, the display panel DP may be electrically connected with the main circuit board MCB through one flexible circuit film, and only one driver chip may be mounted on the one flexible circuit film. Also, the display panel DP may be electrically connected with the main circuit board MCB through four or more flexible circuit films, and driver chips may be respectively mounted on the flexible circuit films.

A structure in which the first to third driver chips DIC1, DIC2, and DIC3 are respectively mounted on the first to third flexible circuit films D-FCB1, D-FCB2, and D-FCB3 is illustrated in FIG. 2, but the present disclosure is not limited thereto. For example, the first to third driver chips DIC1, DIC2, and DIC3 may be directly mounted on the display panel DP. In this case, a portion of the display panel DP, on which the first to third driver chips DIC1, DIC2, and DIC3 are mounted, may be bent such that the first to third driver chips DIC1, DIC2, and DIC3 are disposed on a rear surface of the display module DM. Also, the first to third driver chips DIC1, DIC2, and DIC3 may be directly mounted on the main circuit board MCB.

The input sensing layer ISP may be electrically connected with the main circuit board MCB through the flexible circuit films D-FCB. However, the present disclosure is not limited thereto. That is, the display module DM may additionally include a separate flexible circuit film for electrically connecting the input sensing layer ISP and the main circuit board MCB.

In an embodiment, the driving controller 100 and the voltage generator 300 may be mounted on the main circuit board MCB. The driving controller 100 and the voltage generator 300 may be electrically connected to the display panel DP through the main circuit board MCB and the flexible circuit films D-FCB.

The display device DD further includes an outer case EDC accommodating the display module DM. The outer case EDC may be coupled to the window WM so as to define an exterior appearance of the display device DD. The outer case EDC may absorb external shocks and may prevent a foreign material/moisture or the like from being infiltrated into the display module DM such that components accommodated in the outer case EDC are protected. Meanwhile, as an example of the present disclosure, the outer case EDC may be provided in the form of a combination of a plurality of accommodating members.

Figure 3:
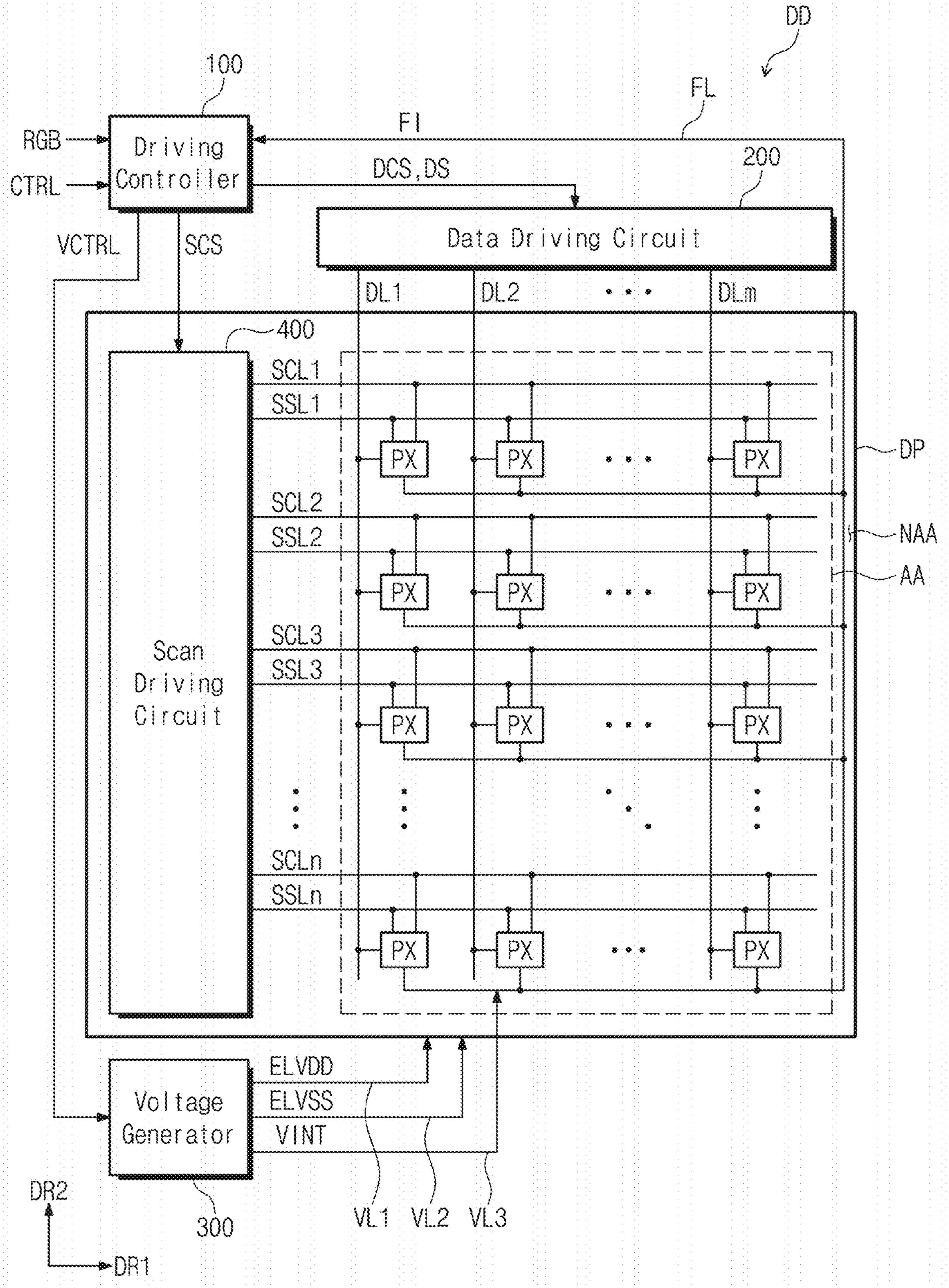
FIG. 3 is a block diagram of a display device according to an embodiment of the present disclosure.

FIG. 3 is a block diagram of a display device DD, according to an embodiment of the present disclosure.

Referring to FIG. 3, the display device DD includes the driving controller 100, a data driving circuit 200, the voltage generator 300, a scan driving circuit 400, and the display panel DP. The driving controller 100, the data driving circuit 200, and the scan driving circuit 400 may be referred to as a driving circuit providing a data signal to the pixels PX of the display panel DP.

The driving controller 100 receives an input image signal RGB and a control signal CTRL. The driving controller 100 converts and outputs the input image signal RGB into an image data signal DS. The driving controller 100 outputs a scan control signal SCS and a data control signal DCS. In an embodiment, the driving controller 100 may output a voltage control signal VCTRL for controlling the voltage generator 300.

The data driving circuit 200 receives the data control signal DCS and the image data signal DS from the driving controller 100. The data driving circuit 200 converts the image data signal DS into data signals and then outputs the data signals to a plurality of data lines DL1 to DLm to be described later. The data signals are analog voltages corresponding to a grayscale value of the image data signal DS. The data driving circuit 200 may be disposed in the driver chips DIC illustrated in FIG. 2.

The display panel DP includes first scan lines SCL1 to SCLn, second scan lines SSL1 to SSLn, the data lines DL1 to DLm, and the pixels PX.

The display panel DP may be divided into the effective area AA and the non-effective area NAA. The pixels PX may be disposed in the effective area AA, and the scan driving circuit 400 may be disposed in the non-effective area NAA.

The first scan lines SCL1 to SCLn and the second scan lines SSL1 to SSLn are arranged to be spaced from each other in the second direction DR2. The data lines DL1 to DLm extend from the data driving circuit 200 in a direction facing away from the second direction DR2 and are arranged to be spaced from each other in the first direction DR1.

The pixels PX are electrically connected to the first scan lines SCL1 to SCLn, the second scan lines SSL1 to SSLn, and the data lines DL1 to DLm. For example, pixels PX belonging to the first row may be connected to the scan lines SCL1 and SSL1. Also, pixels PX belonging to the second row may be connected to the scan lines SCL2 and SSL2.

Each of the plurality of pixels PX includes a light emitting element ED (refer to FIG. 4) and a pixel circuit PXC (refer to FIG. 4) for controlling the emission of the light emitting element ED. The pixel circuit PXC may include a plurality of transistors and a capacitor. The scan driving circuit 400 may include transistors formed through the same process as the pixel circuit PXC. In an embodiment, the light emitting element ED may be an organic light emitting diode. However, the present disclosure is not limited thereto.

Each of the plurality of pixels PX receives a first driving voltage ELVDD, a second driving voltage ELVSS, and an initialization voltage VINT.

The scan driving circuit 400 receives the scan control signal SCS from the driving controller 100. In response to the scan control signal SCS, the scan driving circuit 400 may output first scan signals to the first scan lines SCL1 to SCLn and may output second scan signals to the second scan lines SSL1 to SSLn.

In an embodiment, the scan driving circuit 400 may be disposed in the non-effective area NAA adjacent to the first side of the effective area AA. The first scan lines SCL1 to SCLn and the second scan lines SSL1 to SSLn extend from the scan driving circuit 400 in the first direction DR1.

In an embodiment, scan driving circuits may be respectively disposed on the first side and the second side of the effective area AA. For example, the scan driving circuit disposed on the first side of the effective area AA may provide the first scan signals to the first scan lines SCL1 to SCLn, and the scan driving circuit disposed on the second side of the effective area AA may provide the second scan signals to the second scan lines SSL1 to SSLn.

The voltage generator 300 generates voltages necessary for the operation of the display panel DP. In an embodiment, the voltage generator 300 generates the first driving voltage ELVDD, the second driving voltage ELVSS, and the initialization voltage VINT, which are necessary for the operation of the display panel DP. The first driving voltage ELVDD, the second driving voltage ELVSS and the initialization voltage VINT may be provided to the display panel DP through a first voltage line VL1, a second voltage line VL2, and a third voltage line VL3, respectively.

As well as the first driving voltage ELVDD the second driving voltage ELVSS, and the initialization voltage VINT, the voltage generator 300 may further generate various voltages necessary for operations of the display panel DP, the driving controller 100, the data driving circuit 200, and the scan driving circuit 400.

In an embodiment, the driving controller 100 may output the voltage control signal VCTRL for controlling the voltage generator 300.

In an embodiment, the driving controller 100 may output the voltage control signal VCTRL based on a feedback current signal FI received from the display panel DP through a feedback line FL. The configuration and operation of the driving controller 100 will be described in detail later.

Figure 4:
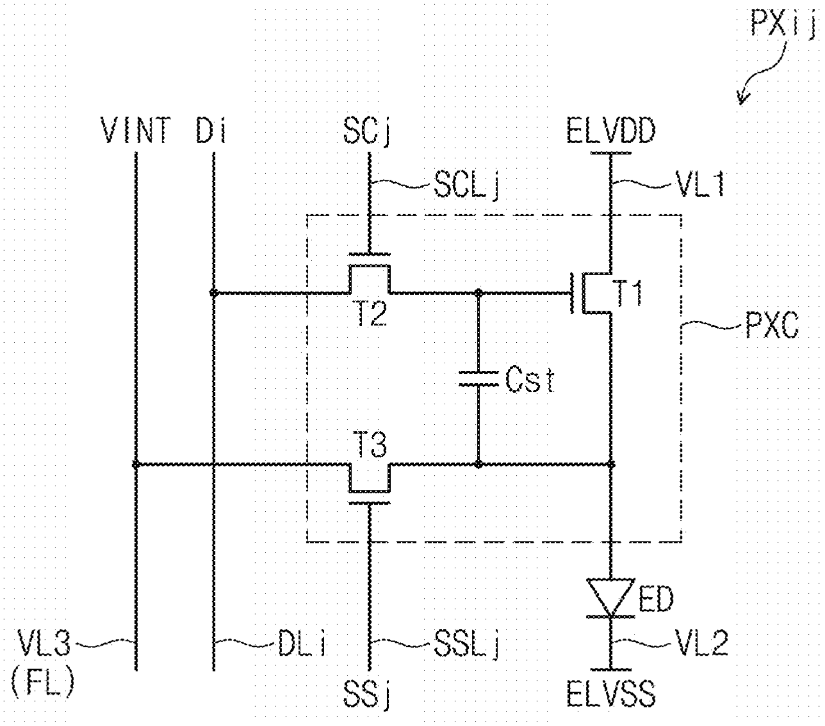
FIG. 4 is an equivalent circuit diagram of a pixel according to an embodiment of the present disclosure.

FIG. 4 is an equivalent circuit diagram of a pixel PXij according to an embodiment of the present disclosure.

An equivalent circuit diagram of a pixel PXij that is connected to the i-th data line DLi among the data lines DL1 to DLm (refer to FIG. 1), the j-th first scan line SCLj among the first scan lines SCL1 to SCLn (refer to FIG. 3), and the j-th second scan line SSLj among the second scan lines SSL1 to SSLn (refer to FIG. 3) is illustrated in FIG. 4 as an example.

A circuit configuration of each of the plurality of pixels PX illustrated in FIG. 1 may be the same as the equivalent circuit configuration of the pixel PXij illustrated in FIG. 4. In an embodiment, the pixel PXij includes at least one light emitting element ED and the pixel circuit PXC.

The pixel circuit PXC may include at least one transistor that is electrically connected to the light emitting element ED and is used to provide a current corresponding to a data signal Di transferred from the data line DLi to the light emitting element ED. In an embodiment, the pixel circuit PXC of the pixel PX includes a first transistor T1, a second transistor T2, a third transistor T3, and a capacitor Cst. Each of the first to third transistors T1 to T3 is an N-type transistor by using an oxide semiconductor as a semiconductor layer. However, the present disclosure is not limited thereto. For example, each of the first to third transistors T1 to T3 may be a P-type transistor having a low-temperature polycrystalline silicon (LTPS) semiconductor layer. In an embodiment, at least one of the first to third transistors T1 to T3 may be an N-type transistor and the rest may be P-type transistors. Also, a circuit configuration of a pixel according to the present disclosure is not limited to FIG. 4. The pixel circuit PXC illustrated in FIG. 3 is provided only as an example, and the configuration of the pixel circuit PXC may be modified and implemented.

Referring to FIG. 3, the first scan line SCLj may transfer a first scan signal SCj, and the second scan line SSLj may transfer a second scan signal SSj. The data line DLi transfers the data signal Di. The data signal Di may have a voltage level corresponding to the input image signal RGB that is input to the display device DD (refer to FIG. 1).

The first voltage line VL1 and the third voltage line VL3 may respectively transfer the first driving voltage ELVDD and the initialization voltage VINT to the pixel circuit PXC, and the second voltage line VL2 may transfer the second driving voltage ELVSS to a cathode (or a second terminal) of the light emitting element ED.

The first transistor T1 includes a first electrode connected to the first voltage line VL1, a second electrode electrically connected to an anode (or a first terminal) of the light emitting element ED, and a gate electrode connected to a first end of the capacitor Cst. The first transistor T1 may supply a driving current to the light emitting element ED in response to the data signal Di that is transferred through the data line DLi depending on a switching operation of the second transistor T2.

The second transistor T2 includes a first electrode connected to the data line DLi, a second electrode connected to the gate electrode of the first transistor T1, and a gate electrode connected to the first scan line SCLj. The second transistor T2 may be turned on depending on the first scan signal SCj transferred through the first scan line SCLj and may transfer the data signal Di from the data line DLi to the gate electrode of the first transistor T1.

The third transistor T3 includes a first electrode connected to the third voltage line VL3, a second electrode connected to the anode of the light emitting element ED, and a gate electrode connected to the second scan line SSLj. The third transistor T3 may be turned on depending on the second scan signal SSj transferred through the second scan line SSLj and may transfer the initialization voltage VINT to the anode of the light emitting element ED.

The first end of the capacitor Cst is connected to the gate electrode of the first transistor T1 as described above, and a second end of the capacitor Cst is connected to the second electrode of the first transistor T1. The structure of the pixel PXij according to an embodiment is not limited to the structure illustrated in FIG. 4. In the pixel PXij, the number of transistors, the number of capacitors, and a connection relationship of the transistors and the capacitors may be variously changed or modified.

The pixel PXij may operate in an emission mode and a current sensing mode. In the emission mode, when the third transistor T3 is turned on, the initialization voltage VINT from the third voltage line VL3 may be transferred to the anode of the light emitting element ED.

In the current sensing mode, when the third transistor T3 is turned on, the voltage of the anode of the light emitting element ED corresponding to the data signal Di may be transferred to the third voltage line VL3. In an embodiment, the third voltage line VL3 may be the feedback line FL.

In an embodiment, the third voltage line VL3 and the feedback line FL may be implemented with different wires.

Figure 5:
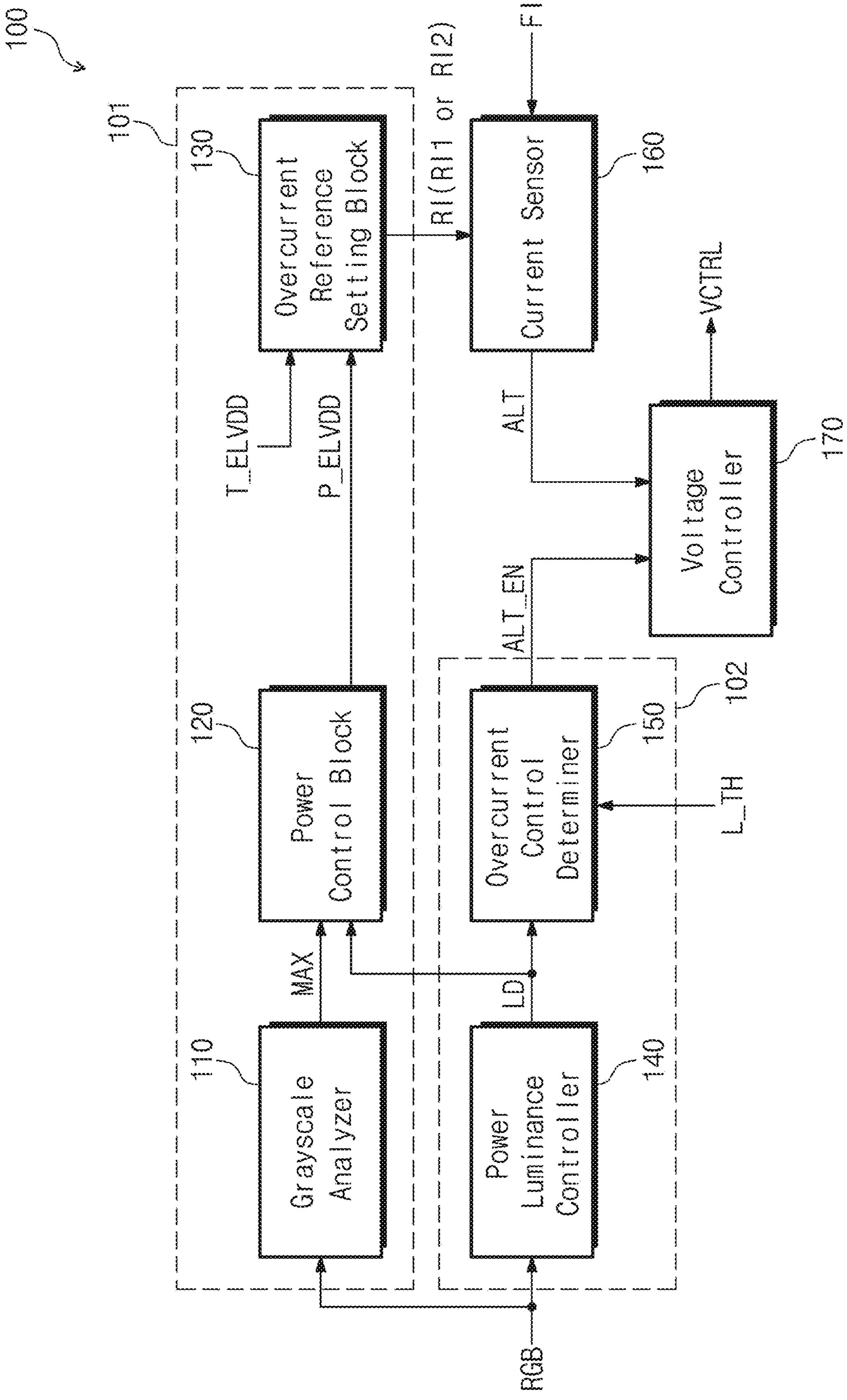
FIG. 5 is a block diagram illustrating a configuration of a driving controller.

FIG. 5 is a block diagram illustrating a configuration of the driving controller 100.

Only components associated with a voltage control function for adjusting power consumption from among functions of the driving controller 100 are illustrated in FIG. 5. As well as the components illustrated in FIG. 5, the driving controller 100 may further include components associated with various functions (e.g., components associated with a function of converting the input image signal RGB into the image data signal DS and components associated with a function of outputting the scan control signal SCS and the data control signal DCS in response to the control signal CTRL).

Referring to FIG. 5, the driving controller 100 includes an overcurrent reference controller 101, an overcurrent load calculator 102, a current sensor 160, and a voltage controller 170.

The overcurrent reference controller 101 analyzes the grayscale of the input image signal RGB and outputs one of a first reference current signal RI1 corresponding to the grayscale and a second reference current signal RI2 whose current level is higher than that of the first reference current signal RI1, as a reference current signal RI.

The overcurrent load calculator 102 calculates the load of the input image signal RGB, compares the load and a reference load L_TH, and outputs a first signal ALT_EN corresponding to a comparison result.

The current sensor 160 receive the feedback current signal FI from the display panel DP (refer to FIG. 3), compares the current level of the feedback current signal FI and the current level of the reference current signal RI, and outputs a second signal ALT corresponding to a comparison result.

The voltage controller 170 outputs the voltage control signal VCTRL based on the first signal ALT_EN and the second signal ALT. The voltage control signal VCTRL may be provided to the voltage generator 300 illustrated in FIG. 3.

The configuration and operation of the driving controller 100 will be described in detail below. The overcurrent reference controller 101 includes a grayscale analyzer 110, a power control block 120, and an overcurrent reference setting block 130.

The grayscale analyzer 110 analyzes the grayscale of the input image signal RGB of one frame. The grayscale analyzer 110 detects a maximum grayscale MAX of the input image signal RGB of one frame.

The power control block 120 predicts the voltage level of the first driving voltage ELVDD based on the maximum grayscale MAX from the grayscale analyzer 110 and a load LD from a power luminance controller 140. The power control block 120 outputs a prediction voltage signal P_ELVDD corresponding to the predicted voltage level of the first driving voltage ELVDD.

The overcurrent reference setting block 130 compares the prediction voltage signal P_ELVDD and a target voltage signal T_ELVDD and outputs the reference current signal RI corresponding to a comparison result.

In an embodiment, each of the prediction voltage signal P_ELVDD and the target voltage signal T_ELVDD may be a digital signal.

In an embodiment, when the voltage level of the prediction voltage signal P_ELVDD is lower than the voltage level of the target voltage signal T_ELVDD, the overcurrent reference setting block 130 outputs the first reference current signal RI1 as the reference current signal RI.

In an embodiment, when the voltage level of the prediction voltage signal P_ELVDD is higher than or equal to the voltage level of the target voltage signal T_ELVDD, the overcurrent reference setting block 130 outputs the second reference current signal RI2 as the reference current signal RI.

In an embodiment, the current level of the second reference current signal RI2 is higher than the current level of the first reference current signal RI1.

The overcurrent load calculator 102 includes the power luminance controller 140 and an overcurrent control determiner 150. The power luminance controller 140 calculates the load LD of the input image signal RGB. In an embodiment, the power luminance controller 140 may adjust luminance of an image to be displayed in the display panel DP (refer to FIG. 3) depending on the load LD of the input image signal RGB.

The overcurrent control determiner 150 compares the load LD from the power luminance controller 140 and the reference load L_TH and outputs the first signal ALT_EN corresponding to a comparison result.

In an embodiment, when the load LD is smaller than the reference load L_TH, the overcurrent control determiner 150 outputs the first signal ALT_EN of the active level.

When the load LD is greater than or equal to the reference load L_TH, the overcurrent control determiner 150 outputs the first signal ALT_EN of the inactive level.

The voltage controller 170 outputs the voltage control signal VCTRL based on the first signal ALT_EN and the second signal ALT. When both the first signal ALT_EN and the second signal ALT are at the active level, the voltage controller 170 may output the voltage control signal VCTRL such that the voltage level of the first driving voltage ELVDD decreases.

Figure 6:
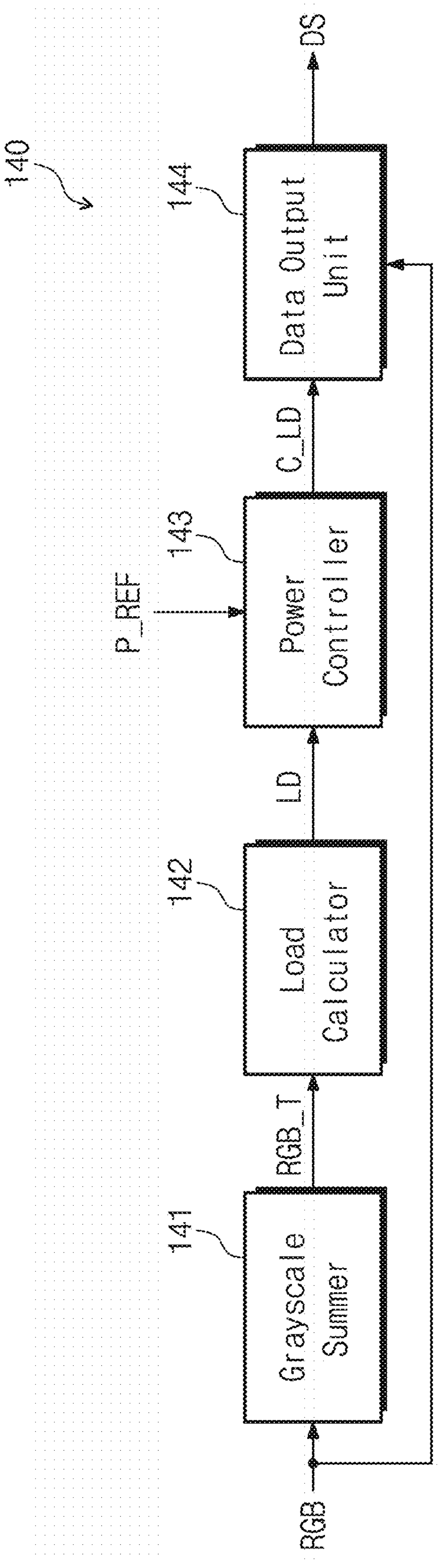
FIG. 6 is a block diagram illustrating a configuration of a power luminance controller illustrated in FIG. 5.

FIG. 6 is a block diagram illustrating a configuration of the power luminance controller 140 illustrated in FIG. 5.

Referring to FIG. 6, the power luminance controller 140 includes a grayscale summer 141, a load calculator 142, a power controller 143, and a data output unit 144.

The grayscale summer 141 sums the input image signal RGB of one frame and outputs a sum signal RGB_T.

For example, the display panel DP may be divided into a plurality of blocks, and the grayscale summer 141 may calculate a sum of respective gray levels of the blocks.

The load calculator 142 may calculate the load LD of one frame based on the sum signal RGB_T.

The load LD may have a value between 0% and 100%. For example, when the input image signal RGB corresponds to a full black image (e.g., a 0 gray level), the load LD may be 0%. Also, when the input image signal RGB corresponds to a full white image (e.g., a 255 gray level), the load LD may be 100%.

In an embodiment, the load LD output from the load calculator 142 may be provided to the overcurrent control determiner 150 illustrated in FIG. 5.

The power controller 143 adjusts a level of the load LD depending on a power consumption reference value P_REF and outputs an adjusted load signal C_LD.

The data output unit 144 may output the image data signal DS obtained by adjusting the gray level of the input image signal RGB based on the adjusted load signal C_LD.

Figure 7:
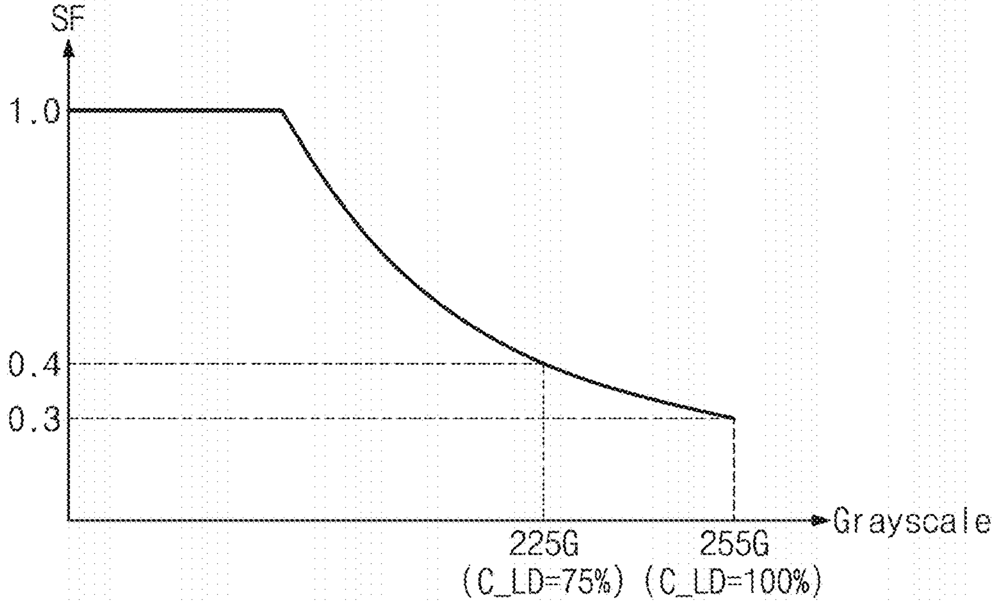
FIG. 7 is a diagram illustrating a scale factor of a data output unit illustrated in FIG. 6.

FIG. 7 is a diagram illustrating a scale factor of the data output unit 144 illustrated in FIG. 6.

Referring to FIGS. 6 and 7, to maintain or decrease the grayscale of the input image signal RGB, the data output unit 144 may calculate a scale factor SF depending on the adjusted load signal C_LD. The scale factor SF may have a value that is smaller than or equal to "1". For example, when the scale factor SF is 0.5, the grayscale of the image data signal DS may decrease to half of the grayscale of the input image signal RGB.

In an embodiment, the scale factor SF may be value that is differently set depending on the adjusted load signal C_LD. For example, as the adjusted load signal C_LD increases (i.e., becomes closer to 100%), the scale factor SF may decrease; as the adjusted load signal C_LD decreases (i.e., becomes closer to 0%), the scale factor SF may increase to 1.

In the following description, for convenience of description, it is assumed that the adjusted load signal C_LD and the load LD are identical to each other.

For example, when the sum signal RGB_T for the input image signal RGB corresponds to a full white image (i.e., a 255 gray level), the scale factor SF may be 0.3. When the sum signal RGB_T corresponds to the 225 gray level, the scale factor SF may be 0.4. When the sum signal RGB_T corresponds to a full black image (i.e., a 0 gray level), the scale factor SF may be 1.

When the sum signal RGB_T for the input image signal RGB indicates a high gray level, that is, when it is expected that the power consumption of the display panel DP is high, the power luminance controller 140 decreases the grayscale of the image data signal DS depending on the scale factor SF so as to be lower than the grayscale of the input image signal RGB. As a result, it may be possible to prevent the display panel DP (refer to FIG. 3) from being damaged due to the overcurrent.

Returning to FIG. 5, when the load LD output from the power luminance controller 140 is higher than the reference load L_TH, the grayscale of the image data signal DS may be adjusted by the power luminance controller 140, and thus, the current consumption of the display panel DP (returning to FIG. 3) may be reduced.

When the load LD is higher than the reference load L_TH, the overcurrent control determiner 150 outputs the first signal ALT_EN of the inactive level. While the overcurrent control determiner 150 outputs the first signal ALT_EN of the inactive level, the grayscale of the image data signal DS is adjusted by the power luminance controller 140, and thus, the voltage controller 170 does not need to decrease the voltage level of the first driving voltage ELVDD. Therefore, while the first signal ALT_EN is at the inactive level, the voltage controller 170 may not change the voltage control signal VCTRL for the purpose of decreasing the voltage level of the first driving voltage ELVDD.

Figure 8:
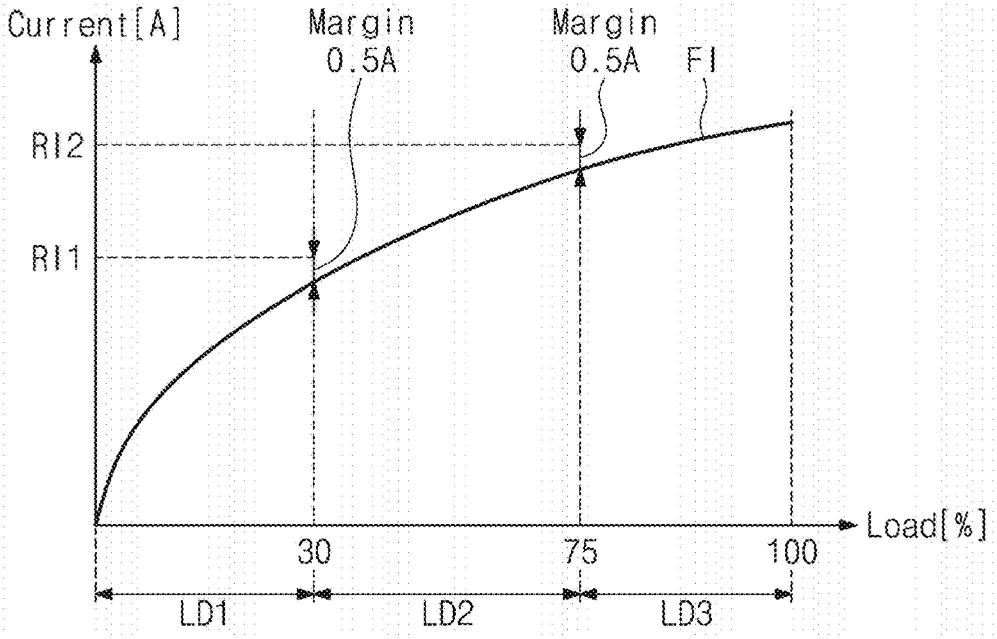
FIG. 8 is a diagram illustrating a first reference current signal and a second reference current signal according to a load.

FIG. 8 is a diagram illustrating the first reference current signal RI1 and the second reference current signal RI2 according to a load.

Referring to FIGS. 5 and 8, the power control block 120 predicts the voltage level of the first driving voltage ELVDD based on the maximum grayscale MAX and the load LD and outputs the prediction voltage signal P_ELVDD.

Depending on a relationship between the prediction voltage signal P_ELVDD and the target voltage signal T_ELVDD, the overcurrent reference setting block 130 outputs one of the first reference current signal RI1 and the second reference current signal RI2 as the reference current signal RI.

For example, when the load LD is included in a first load zone LD1, the reference current signal RI may be the first reference current signal RI1.

For example, when the load LD is included in a second load zone LD2, the reference current signal RI may be the second reference current signal RI2.

In an embodiment, the first load zone LD1 may be a zone in which the load LD ranges from 0% to 30%, and the second load zone LD2 may be a zone in which the load LD ranges from 30% to 75%.

The power control block 120 may set a current level to the first reference current signal RI1 in consideration of the maximum grayscale MAX such that a current margin is secured as much as a given current level (e.g., 0.5 A) when an upper limit value of the first load zone LD1, that is, the load LD is 30%.

The power control block 120 may set a current level to the second reference current signal RI2 in consideration of the maximum grayscale MAX such that a current margin is secured as much as a given current level (e.g., 0.5 A) when an upper limit value of the second load zone LD2, that is, the load LD is 75%.

A third load zone LD3 may be a zone in which the voltage controller 170 does not need to adjust the voltage level of the first driving voltage ELVDD, as described with reference to FIGS. 6 and 7.

The first load zone LD1, the second load zone LD2, the third load zone LD3, and the current margin illustrated in FIG. 8 are provided only as an example for better understanding of the present disclosure, and the present disclosure is not limited thereto.

When the current level of the feedback current signal FI is higher than the current level of the reference current signal RI, that is, one of the first reference current signal RI1 and the second reference current signal RI2, the current sensor 160 outputs the second signal ALT of the active level.

Assuming that the current load LD belongs to the first load zone LD1, the current sensor 160 may output the second signal ALT of the active level when the current level of the feedback current signal FI is higher than the current level of the first reference current signal RI1.

Assuming that the current load LD belongs to the second load zone LD2, the current sensor 160 may output the second signal ALT of the active level when the current level of the feedback current signal FI is higher than the current level of the second reference current signal RI2.

Figure 9:
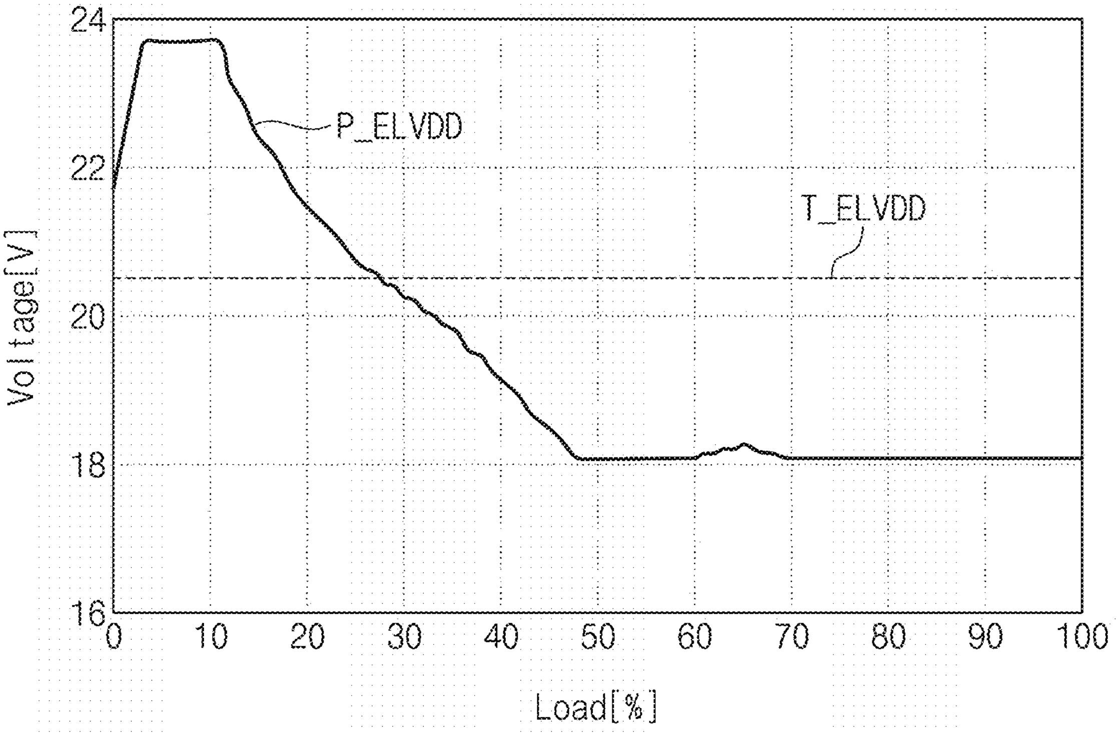
FIG. 9 is a diagram illustrating a voltage level change of a prediction voltage signal according to a load.

FIG. 9 is a diagram illustrating a voltage level change of the prediction voltage signal P_ELVDD according to the load LD.

Referring to FIGS. 5 and 9, the power control block 120 outputs the prediction voltage signal P_ELVDD based on the load LD and the maximum grayscale MAX. When the load LD is low, the voltage level of the prediction voltage signal P_ELVDD is high; when the load LD is higher than a given level, the voltage level of the prediction voltage signal P_ELVDD decreases to a minimum voltage (e.g., 18 V).

The overcurrent reference setting block 130 compares the prediction voltage signal P_ELVDD and the target voltage signal T_ELVDD and may output the reference current signal RI corresponding to a comparison result.

Figure 10:
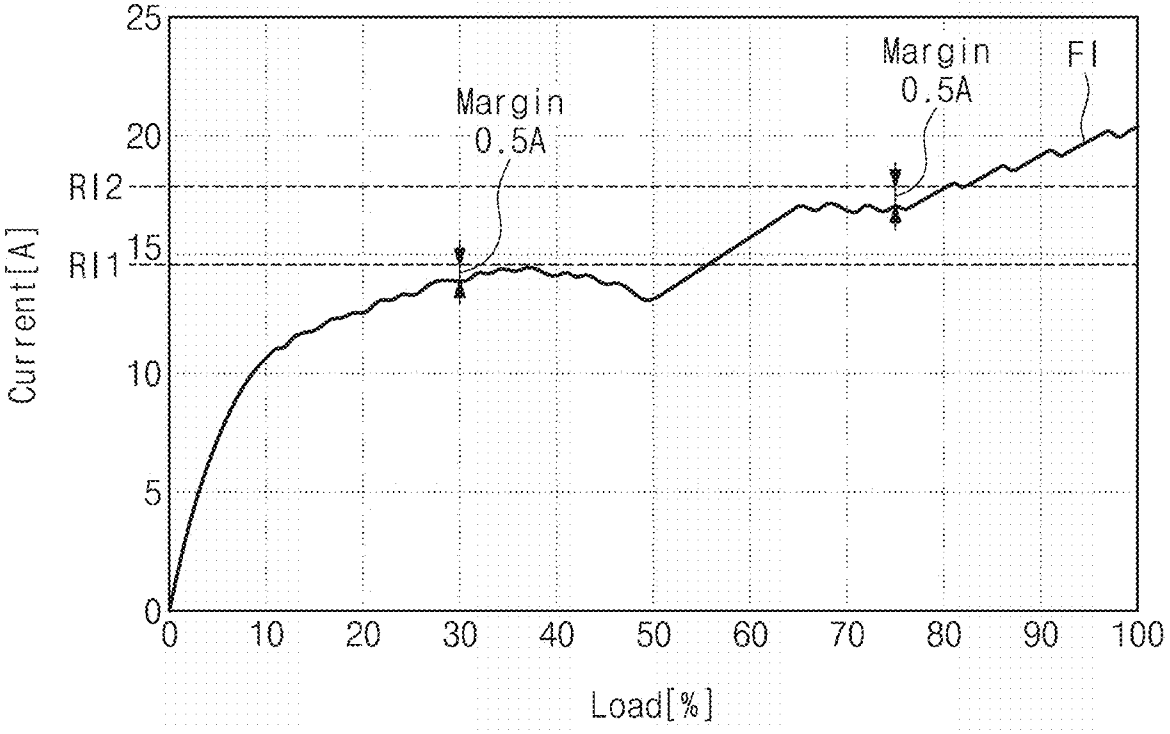
FIG. 10 is a diagram illustrating a relationship between a feedback current signal and first and second reference current signals in a state where an overcurrent event does not occur.

FIG. 10 is a diagram illustrating a relationship between the feedback current signal FI and the first and second reference current signals RI1 and RI2 in a state where an overcurrent event does not occur.

Referring to FIGS. 5 and 10, when the current load LD is lower than 30%, the reference current signal RI may be the first reference current signal RI1. In a state where an overcurrent event does not occur, a minimum current margin of the feedback current signal FI and the first reference current signal RI1 may be 0.5 A.

When the current load LD is greater than or equal to 30%, the reference current signal RI may be the second reference current signal RI2. In a state where an overcurrent event does not occur, a minimum current margin of the feedback current signal FI and the second reference current signal RI2 may be 0.5 A.

Figure 11A:
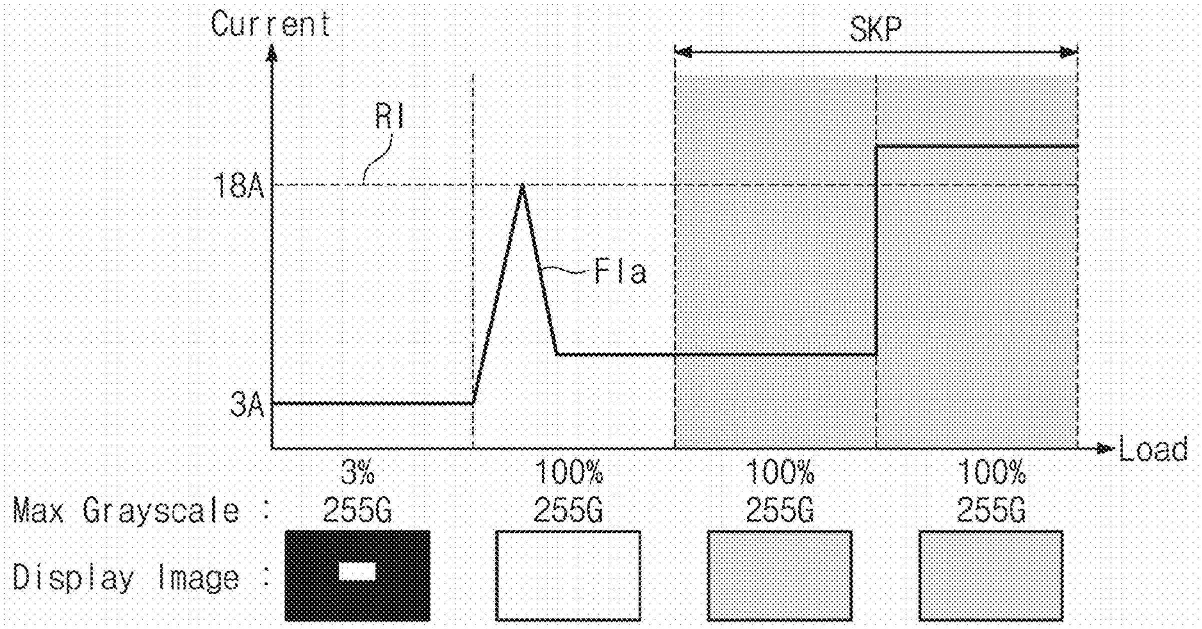
FIG. 11A is a diagram illustrating a feedback current signal when the same reference current signal is applied regardless of a load.

FIG. 11A is a diagram illustrating the feedback current signal FI when the same reference current signal RI is applied regardless of a load.

Referring to FIGS. 5 and 11A, in an embodiment, the current level of the reference current signal RI of the overcurrent reference setting block 130 may be a uniform current level (e.g., 18 A) regardless of the load LD.

When the maximum grayscale MAX is a 255 gray level 255G and the load LD is 3%, the current level of a feedback current signal FIa may be lower than the current level of the reference current signal RI.

When the maximum grayscale MAX is the 255 gray level 255G and the load LD is 100%, the current level of the feedback current signal FIa may increase as much as the current level of the reference current signal RI, that is, 18 A.

The power luminance controller 140 described with reference to FIG. 6 may output the image data signal DS whose gray level is adjusted depending on the load LD of the input image signal RGB. A time of one frame may be required for the operation of the power luminance controller 140. Therefore, even though the load LD is 100%, the current level of the feedback current signal FIa may increase to the current level of the reference current signal RI, that is, 18 A.

When the current level of the feedback current signal FIa increases to the current level of the reference current signal RI, that is, 18 A, the current sensor 160 outputs the second signal ALT of the active level.

In a skip period SKP where the first signal ALT_EN is at the inactive level, the voltage controller 170 may not perform the voltage control operation regardless of the current level of the feedback current signal FI.

Figure 11B:
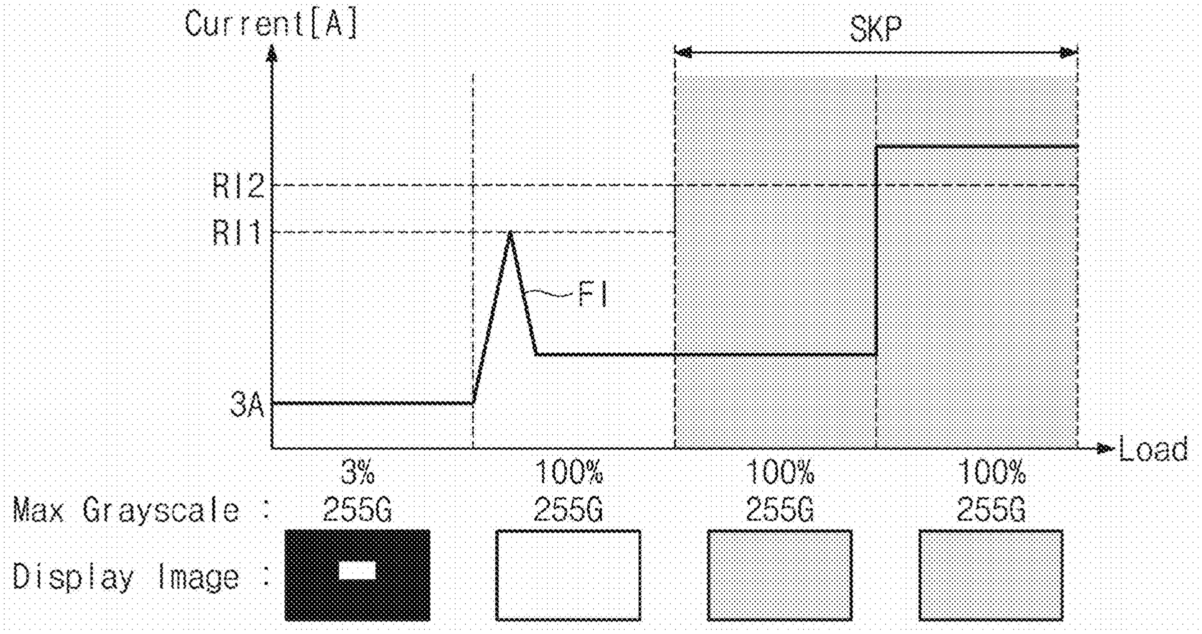
FIG. 11B is a diagram illustrating a feedback current signal when one of a first reference current signal and a second reference current signal is selected as a reference current signal depending on a load.

FIG. 11B is a diagram illustrating the feedback current signal FI when one of the first reference current signal RI1 and the second reference current signal RI2 is selected as the reference current signal RI depending on a load.

Referring to FIGS. 5 and 11B, in an embodiment, the reference current signal RI of the overcurrent reference setting block 130 may be one of the first reference current signal RI1 and the second reference current signal RI2 depending on the load LD. In an embodiment, the current level of the first reference current signal RI1 may be lower than the current level of the second reference current signal RI2. In an embodiment, the first reference current signal RI1 may correspond to 16 A, and the second reference current signal RI2 may be the same as the current level of the reference current signal RI, that is, 18 A illustrated in FIG. 11A.

When the maximum grayscale MAX is the 255 gray level 255G and the load LD is 3%, the current level of the feedback current signal FI may be lower than the current level of the first reference current signal RI1.

When the maximum grayscale MAX is the 255 gray level 255G and the load LD is 100%, the current level of the feedback current signal FI may increase as much as the current level of the first reference current signal RI1, that is, 16 A.

The power luminance controller 140 described with reference to FIG. 6 may output the image data signal DS whose gray level is adjusted depending on the load LD of the input image signal RGB. A time of one frame may be required for the operation of the power luminance controller 140. Therefore, even though the load LD is 100%, the current level of the feedback current signal FI may increase to the current level of the first reference current signal RI1, that is, 16 A.

When the current level of the feedback current signal FI increases to the current level of the first reference current signal RI1 being the reference current signal RI, that is, 16 A, the current sensor 160 outputs the second signal ALT of the active level.

In the skip period SKP where the first signal ALT_EN is at the inactive level, the voltage controller 170 may not perform the voltage control operation regardless of the current level of the feedback current signal FI.

Figure 12A:
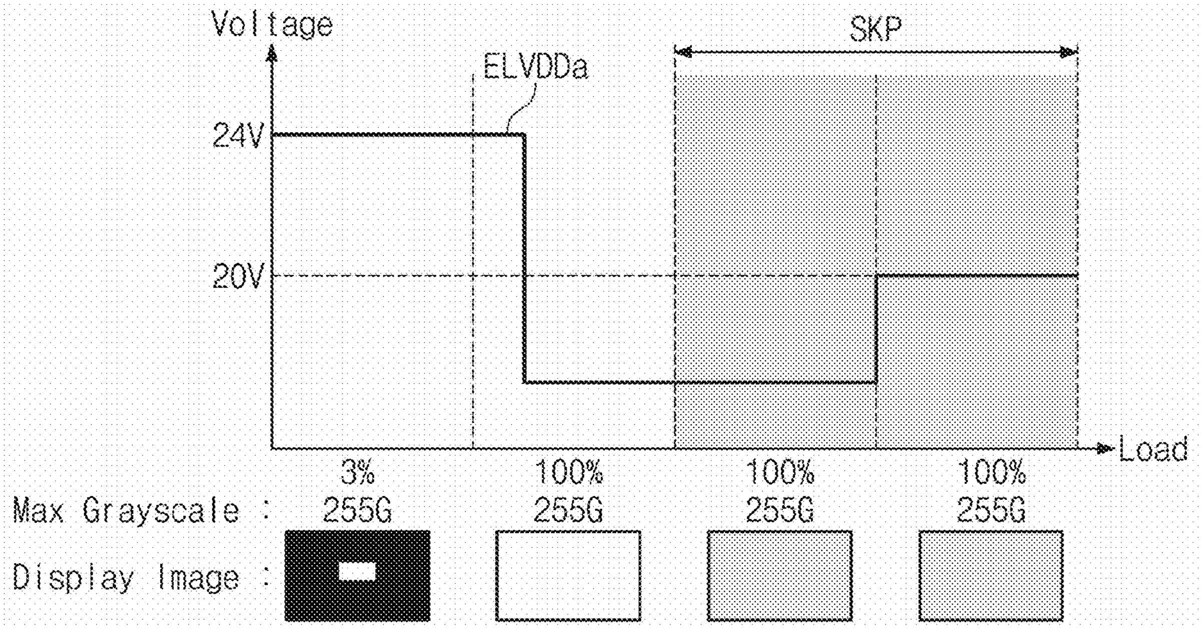
FIG. 12A is a diagram illustrating a first driving voltage according to a feedback current signal illustrated in FIG. 11A.

FIG. 12A is a diagram illustrating a first driving voltage ELVDDa according to the feedback current signal FIa illustrated in FIG. 11A.

Referring to FIGS. 5, 11A, and 12A, when the current level of the feedback current signal FIa is lower than the current level of the reference current signal RI, a first driving voltage ELVDDa may be of a first voltage level (e.g., 24 V) set in advance.

When the current level of the feedback current signal FIa increases to the current level of the reference current signal RI, that is, 18 A, the current sensor 160 outputs the second signal ALT of the active level. When both the first signal ALT_EN and the second signal ALT are at the active level, the voltage controller 170 outputs the voltage control signal VCTRL such that the voltage level of the first driving voltage ELVDDa decreases. Therefore, the voltage level of the first driving voltage ELVDD may be changed to a voltage level lower than the first voltage level.

In the skip period SKP where the first signal ALT_EN is at the inactive level, the voltage controller 170 may not perform the voltage control operation regardless of the current level of the feedback current signal FI.

Figure 12B:
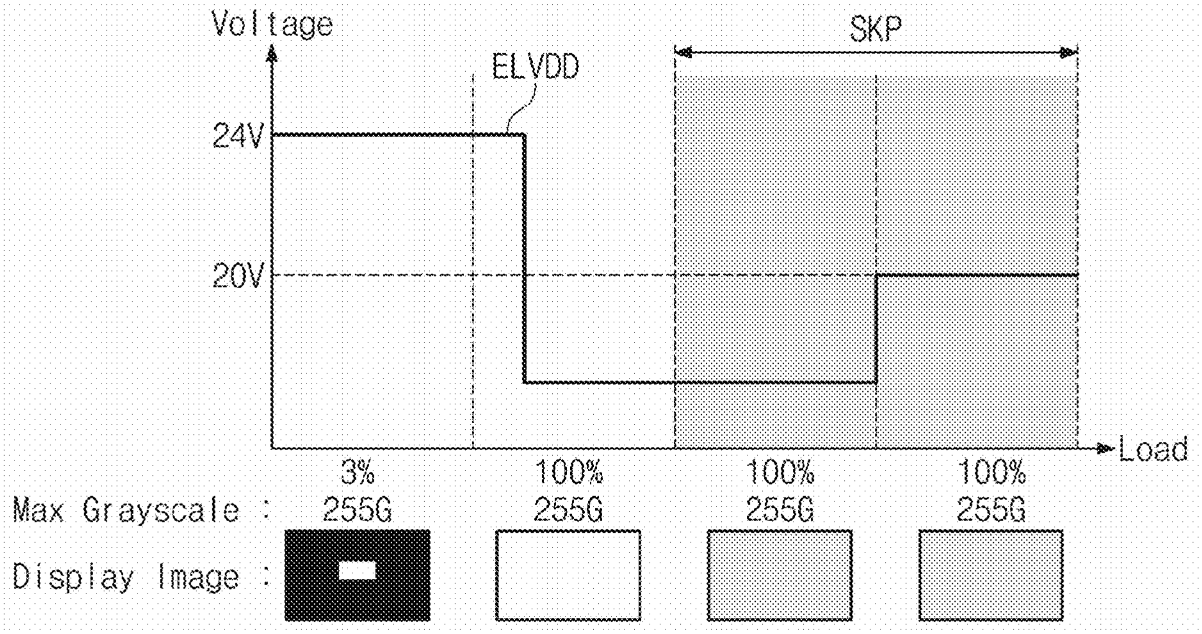
FIG. 12B is a diagram illustrating a first driving voltage according to a feedback current signal illustrated in FIG. 11B.

FIG. 12B is a diagram illustrating the first driving voltage ELVDD according to the feedback current signal FI illustrated in FIG. 11B.

Referring to FIGS. 5, 11B, and 12B, when the current level of the feedback current signal FI is lower than the current level of the first reference current signal RI1, the first driving voltage ELVDD may be of a first voltage level (e.g., 24 V) set in advance.

When the current level of the feedback current signal FI increases to the current level of the first reference current signal RI1, that is, 16 A, the current sensor 160 outputs the second signal ALT of the active level. When both the first signal ALT_EN and the second signal ALT are at the active level, the voltage controller 170 outputs the voltage control signal VCTRL such that the voltage level of the first driving voltage ELVDD decreases. Therefore, the voltage level of the first driving voltage ELVDD may be changed to a voltage level lower than the first voltage level.

In the skip period SKP where the first signal ALT_EN is at the inactive level, the voltage controller 170 may not perform the voltage control operation regardless of the current level of the feedback current signal FI.

Figure 13A:
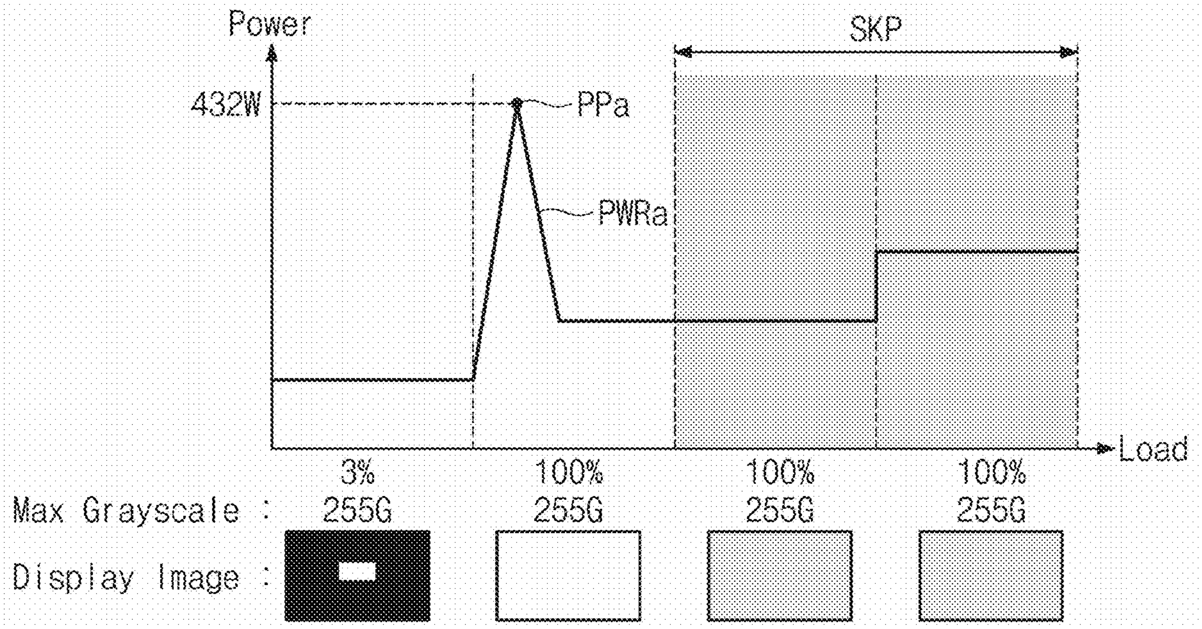
FIG. 13A is a diagram illustrating power consumption according to a feedback current signal illustrated in FIG. 11A and a first driving voltage illustrated in FIG. 11A.

FIG. 13A is a diagram illustrating power consumption PWRa according to the feedback current signal FIa illustrated in FIG. 11A and the first driving voltage ELVDDa illustrated in FIG. 12A.

Referring to FIGS. 11A, 12A, and 13A, the power consumption PWRa of the display panel DP (referring to FIG. 3) may be calculated by multiplying the feedback current signal FIa and the first driving voltage ELVDDa together.

Figure 13B:
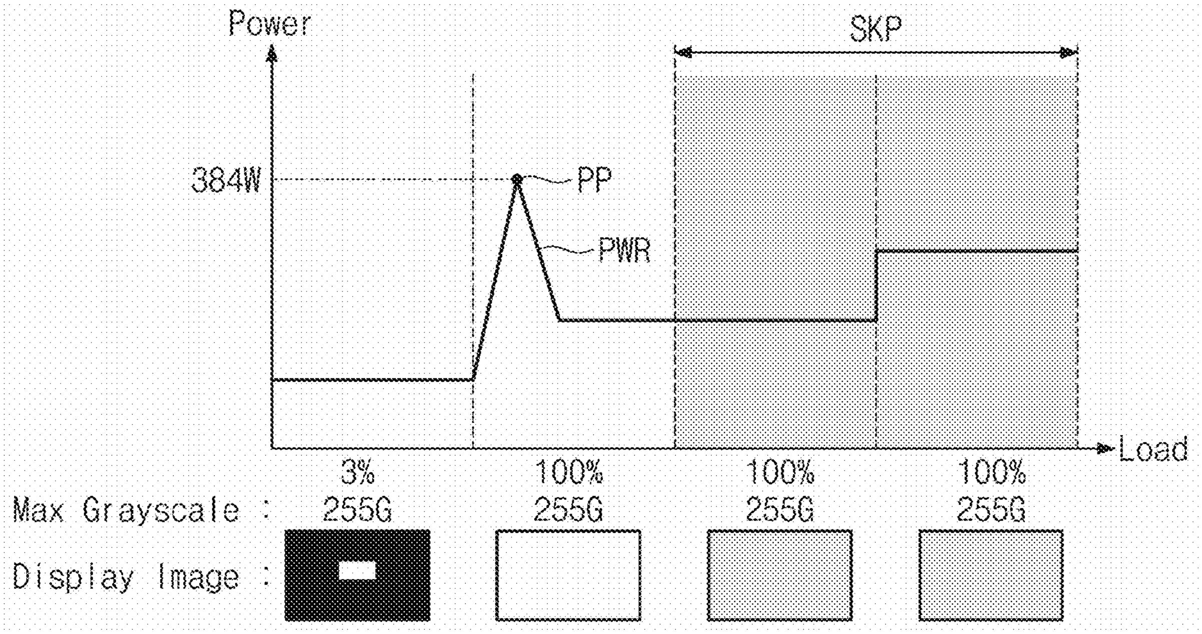
FIG. 13B is a diagram illustrating power consumption according to a feedback current signal illustrated in FIG. 11B and a first driving voltage illustrated in FIG. 12B.

In the example illustrated in FIG. 13A, a peak power PPa is 432 W (=24V×18 A). FIG. 13B is a diagram illustrating power consumption PWR according to the feedback current signal FI illustrated in FIG. 11B and the first driving voltage ELVDD illustrated in FIG. 12B.

FIGS. 11B, 12B, and 13B, the power consumption PWR of the display panel DP (referring to FIG. 3) may be calculated by multiplying the feedback current signal FI and the first driving voltage ELVDD together.

In the example illustrated in FIG. 13B, a peak power PP is 384 W (=24V×16 A).

In a low load zone, as the reference current signal RI is set to the first reference current signal RI1 lower than the second reference current signal RI2, the power consumption of the display panel DP may decrease at a point in time when the overcurrent of the display panel DP is sensed. Therefore, the display panel DP may be prevented from being damaged due to the sudden increase in power consumption.

Figure 14A:
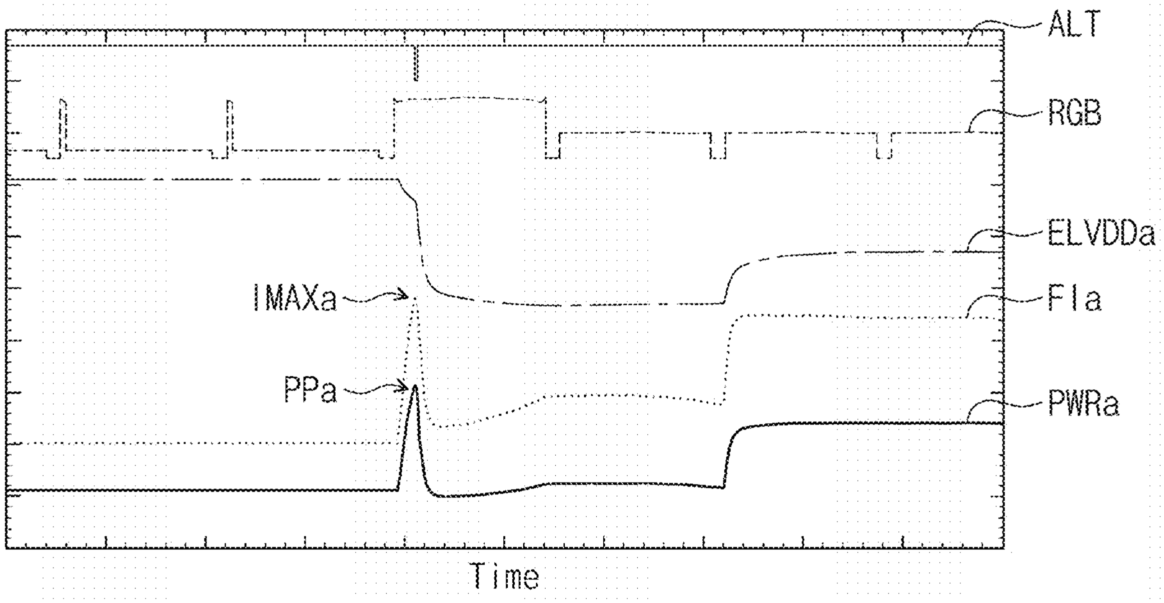
FIG. 14A is a diagram illustrating a feedback current signal and power consumption according to an operation of a display device when a uniform reference current signal is applied regardless of a load.

FIG. 14A is a diagram illustrating the feedback current signal FIa and the power consumption PWRa according to the operation of the display device DD when the uniform reference current signal RI is applied regardless of a load.

FIG. 14A shows how the second signal ALT, the input image signal RGB, the first driving voltage ELVDDa, the feedback current signal FIa, and the power consumption PWRa change over time.

Referring to FIGS. 5 and 14A, when the input image signal RGB has a high grayscale (i.e., when the load LD is great), the feedback current signal FIa received from the display panel DP (referring to FIG. 3) increases. When the current level of the feedback current signal FIa is higher than or equal to the current level of the reference current signal RI (i.e., when the current level of a maximum current IMAXa is higher than or equal to the current level of the reference current signal RI), the second signal ALT transitions to the active level (e.g., a low level).

When both the first signal ALT_EN and the second signal ALT are at the active level, the voltage controller 170 may output the voltage control signal VCTRL such that the voltage level of the first driving voltage ELVDDa decreases.

Figure 14B:
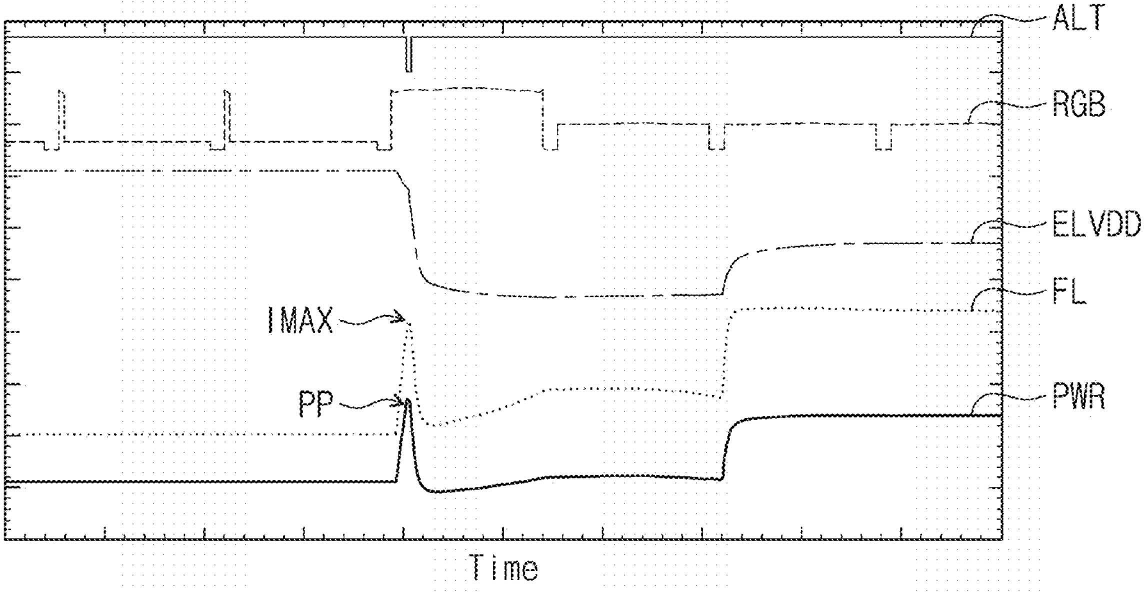
FIG. 14B is a diagram illustrating a feedback current signal and power consumption according to an operation of a display device when one of a first reference current signal and a second reference current signal is selected as a reference current signal depending on a load.

FIG. 14B is a diagram illustrating the feedback current signal FI and the power consumption PWR according to the operation of the display device DD when one of the first reference current signal RI1 and the second reference current signal RI2 is selected as the reference current signal RI depending on a load.

FIG. 14B shows how the second signal ALT, the input image signal RGB, the first driving voltage ELVDD, the feedback current signal FI, and the power consumption PWR change over time.

Referring to FIGS. 5 and 14B, when the input image signal RGB has a high grayscale (i.e., when the load LD is high), the feedback current signal FI received from the display panel DP (referring to FIG. 3) increases. When the current level of the feedback current signal FI is higher than or equal to the current level of the reference current signal RI (i.e., when the current level of a maximum current IMAX is higher than or equal to the current level of the reference current signal RI), the second signal ALT transitions to the active level (e.g., a low level).

When both the first signal ALT_EN and the second signal ALT are at the active level, the voltage controller 170 may output the voltage control signal VCTRL such that the voltage level of the first driving voltage ELVDD decreases.

In an embodiment, when one of the first reference current signal RI1 and the second reference current signal RI2 is selected as the reference current signal RI depending on the load LD, it may be possible to decrease the maximum current IMAX of the feedback current signal FI lower than the maximum current IMAXa illustrated in FIG. 14A in a state where the load LD is low.

Therefore, the peak power PP of the display device DD may be lower than the peak power PPa illustrated in FIG. 14A.

A display device with the above configuration may prohibit power consumption of a display panel from exceeding a reference level when a transient overcurrent flows in the display panel. Therefore, the display panel may be prevented from being damaged due to the sudden increase in power consumption.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A driving controller comprising:

an overcurrent load calculator configured to calculate a load of an input image signal, to compare the load and a reference load, and to output a first signal corresponding to a first comparison result;

an overcurrent reference controller configured to analyze a grayscale of the input image signal and to output one of a first reference current signal corresponding to the grayscale and a second reference current signal, whose current level is higher than that of the first reference current signal, as a reference current signal;

a current sensor configured to receive a feedback current signal, to compare a current level of the feedback current signal and a current level of the reference current signal, and to output a second signal corresponding to a second comparison result; and a voltage controller configured to output a voltage control signal for adjusting a voltage level of a driving voltage, based on the first signal and the second signal.

2. The driving controller of claim 1, wherein the overcurrent reference controller is configured to:

when the load corresponding to the input image signal belongs to a first load zone, output the first reference current signal as the reference current signal; and when the load corresponding to the input image signal belongs to a second load zone different from the first load zone, output the second reference current signal as the reference current signal.

3. The driving controller of claim 1, wherein the overcurrent reference controller is configured to:

when a voltage level of a prediction voltage signal corresponding to the grayscale is lower than a voltage level of a target voltage signal, output the first reference current signal as the reference current signal; and when the voltage level of the prediction voltage signal corresponding to the grayscale is higher than or equal to the voltage level of the target voltage signal, output the second reference current signal as the reference current signal.

4. The driving controller of claim 1, wherein, when the load is lower than the reference load, the overcurrent load calculator outputs the first signal of an active level.

5. The driving controller of claim 4, wherein, when the current level of the feedback current signal is higher than the current level of the reference current signal, the current sensor outputs the second signal of the active level.

6. The driving controller of claim 5, wherein, when both the first signal and the second signal are at the active level, the voltage controller outputs the voltage control signal such that the voltage level of the driving voltage decreases.

7. The driving controller of claim 1, wherein, when the load is higher than or equal to the reference load, the overcurrent load calculator outputs the first signal of an inactive level.

8. The driving controller of claim 1, wherein the overcurrent reference controller includes:

a grayscale analyzer configured to analyze the grayscale of the input image signal and to output a maximum grayscale in one frame;

a power control block configured to output a prediction voltage signal based on the maximum grayscale and the load; and an overcurrent reference setting block configured to compare the prediction voltage signal and a target voltage signal and to output one of the first reference current signal and the second reference current signal as the reference current signal depending on a third comparison result.

9. The driving controller of claim 8, wherein the overcurrent reference setting block is configured to:

when a voltage level of the prediction voltage signal is lower than a voltage level of the target voltage signal, output the first reference current signal as the reference current signal; and when the voltage level of the prediction voltage signal is higher than or equal to the voltage level of the target voltage signal, output the second reference current signal as the reference current signal.

10. The driving controller of claim 1, wherein the overcurrent load calculator includes:

a power luminance controller configured to calculate the load of the input image signal; and an overcurrent control determiner configured to output the first signal corresponding to the first comparison result of the load and the reference load.

11. The driving controller of claim 10, wherein the overcurrent control determiner is configured to:

when the load is lower than the reference load, output the first signal of an active level; and when the load is higher than or equal to the reference load, output the first signal of an inactive level.

12. A display device comprising:

a display panel;

a driving controller configured to receive an input image signal and to output an image data signal;

a data driving circuit configured to provide a data signal corresponding to the image data signal to the display panel; and a voltage generator configured to provide a driving voltage to the display panel in response to a voltage control signal, wherein the driving controller includes:

an overcurrent load calculator configured to calculate a load of the input image signal, to compare the load and a reference load, and to output a first signal corresponding to a first comparison result;

an overcurrent reference controller configured to analyze a grayscale of the input image signal and to output one of a first reference current signal corresponding to the grayscale and a second reference current signal, whose current level is higher than that of the first reference current signal, as a reference current signal;

a current sensor configured to receive a feedback current signal from the display panel, to compare a current level of the feedback current signal and a current level of the reference current signal, and to output a second signal corresponding to a second comparison result; and a voltage controller configured to output the voltage control signal based on the first signal and the second signal.

13. The display device of claim 12, wherein the overcurrent reference controller is configured to:

when a voltage level of a prediction voltage signal corresponding to the grayscale is lower than a voltage level of a target voltage signal, output the first reference current signal as the reference current signal; and when the voltage level of the prediction voltage signal corresponding to the grayscale is higher than or equal to the voltage level of the target voltage signal, output the second reference current signal as the reference current signal.

14. The display device of claim 12, wherein the overcurrent load calculator is configured to:

when the load is lower than the reference load, output the first signal of an active level; and when the load is higher than or equal to the reference load, output the first signal of an inactive level.

15. The display device of claim 14, wherein, when the current level of the feedback current signal is higher than the current level of the reference current signal, the current sensor outputs the second signal of the active level.

16. The display device of claim 15, wherein, when both the first signal and the second signal are at the active level, the voltage controller outputs the voltage control signal such that a voltage level of the driving voltage decreases.

17. The display device of claim 12, wherein the overcurrent reference controller includes:

a grayscale analyzer configured to analyze the grayscale of the input image signal and to output a maximum grayscale in one frame;

a power control block configured to output a prediction voltage signal based on the maximum grayscale and the load; and an overcurrent reference setting block configured to compare the prediction voltage signal and a target voltage signal and to output one of the first reference current signal and the second reference current signal as the reference current signal depending on a third comparison result.

18. The display device of claim 17, wherein the overcurrent reference setting block is configured to:

when a voltage level of the prediction voltage signal is lower than a voltage level of the target voltage signal, output the first reference current signal as the reference current signal; and when the voltage level of the prediction voltage signal is higher than or equal to the voltage level of the target voltage signal, output the second reference current signal as the reference current signal.

19. The display device of claim 12, wherein the overcurrent load calculator includes:

a power luminance controller configured to calculate the load of the input image signal; and an overcurrent control determiner configured to output the first signal corresponding to the first comparison result of the load and the reference load.

20. The display device of claim 19, wherein the power luminance controller outputs the data signal obtained by adjusting a gray level of the input image signal based on the load.

* * * * *